(12) United States Patent
Takasu

(10) Patent No.: US 8,500,354 B2
(45) Date of Patent: Aug. 6, 2013

(54) WATER-BASED BALLPOINT PEN

(75) Inventor: Youichi Takasu, Nagoya (JP)

(73) Assignee: The Pilot Ink Co., Ltd., Aichi (JP)

( * ) Notice: Subject to any disclaimer, the term of this patent is extended or adjusted under 35 U.S.C. 154(b) by 722 days.

(21) Appl. No.: 11/889,249

(22) Filed: Aug. 10, 2007

(65) Prior Publication Data
US 2007/0292200 A1 Dec. 20, 2007

Related U.S. Application Data

(63) Continuation of application No. 10/840,620, filed on May 7, 2004.

(30) Foreign Application Priority Data

May 9, 2003 (JP) .............................. P. 2003-131066

(51) Int. Cl.
*B43K 7/08* (2006.01)
(52) U.S. Cl.
USPC .......................................................... 401/142
(58) Field of Classification Search
USPC .............. 401/141, 142, 208–217; 106/31.38, 106/31.68, 31.7
See application file for complete search history.

(56) References Cited

U.S. PATENT DOCUMENTS

| 4,545,818 | A | 10/1985 | Inoue et al. |
| 4,671,691 | A | 6/1987 | Case et al. |
| 5,048,992 | A | 9/1991 | Loftin |
| 5,769,931 | A | 6/1998 | Wang et al. |
| 5,785,746 | A * | 7/1998 | Kito et al. .................. 106/31.86 |
| 6,028,126 | A | 2/2000 | Wang et al. |
| 6,132,124 | A | 10/2000 | Ogura et al. |
| 6,305,865 | B1 | 10/2001 | Yoshii et al. |
| 6,805,511 | B2 * | 10/2004 | Ando ............................ 401/214 |
| 6,905,539 | B2 | 6/2005 | Patel et al. |

FOREIGN PATENT DOCUMENTS

EP 1 413 457 A1 4/2004

* cited by examiner

*Primary Examiner* — Huyen Le
(74) *Attorney, Agent, or Firm* — Sughrue Mion, PLLC

(57) ABSTRACT

A water-based ballpoint pen including a specific aqueous ink, a ball, a ballpoint pen tip that holds the ball at a front end of the ballpoint pen tip, an ink follower following the ink with consumption of the ink, and an ink container directly containing the ink and the ink follower. The ink container communicates with a rear portion of the tip. The ink follower includes at least a base oil and a thickener. The ball point pen tip discharges the ink from the top end portion. The ink container supplies the ink to the tip.

7 Claims, 3 Drawing Sheets

WATER-BASED BALLPOINT PEN

This is a continuation of application Ser. No. 10/840,620 filed May 7, 2004. The entire disclosures of the prior application, application Ser. No. 10/840,620 is hereby incorporated by reference.

FIELD OF THE INVENTION

The present invention relates to a water-based ballpoint pen. The water-based ballpoint pen comprises an aqueous ink and an ink follower directly filled in the ink container thereof, and is so designed that the ink follower follows the ink with the consumption of ink therein and prevents the ink from leaking out from the back end of the ink container.

BACKGROUND ART

Heretofore, an oil-based ballpoint pen is disclosed, which comprises an oily ink directly filled in the ink container thereof that has a ballpoint pen tip fitted into one end thereof and in which the tip holds a ball at its top end.

The number of the constitutive members thereof is small and the oil-based ballpoint pen of the type is inexpensive. Because of its constitution as above, however, the oil-based ballpoint pen has some problems. Concretely, when the pen is left with its tip downward, then ink may drop out from the gap between the ball and the tip end. In order to prevent such ink dropping, the gap between the two is extremely narrowed and the ink is made to have an extremely high viscosity of from about 10 to 20 Pa·s or so at room temperature. Accordingly, the pen often feels heavy while writing with it, and tends to give thin letters or images.

On the other hand, a water-based ballpoint pen that is filled with a low-viscosity aqueous ink feels light while writing with it, and may give thick letters or images, but it requires a mechanism for ink flow control and is therefore defective in that its structure is complicated and it is expensive.

Further, a shear-thinning ballpoint pen has been disclosed recently, which comprises an oil-based ballpoint pen mechanism structure mentioned above and contains a shear-thinning aqueous ink and an ink follower filled therein (for example, see Patent Reference 1).

Like the above-mentioned oil-based ballpoint pen, the shear-thinning ballpoint pen is inexpensive and its structure is simple, and, in addition, the ink contained in it has a high viscosity while kept statically with no shearing stress applied thereto, and it is stably held in the ballpoint pen mechanism. On the other hand, while in writing with the pen, the viscosity of the ink alone around the ball is lowered owing to the high shear force of the ball that rotates at high speed, and, as a result, the ink may smoothly run through the gap between the ball and the ball-holding area around it owing to the capillary force thereof, and is therefore transferred onto the surface of paper.

Accordingly, when writing with it, the pen may give thick letters and images and may feel lighter than oil-based ballpoint pens. The shear-thinning ink for the pen is controlled to have a shear-thinning index of from 0.1 to 0.6 or so in order that it is prevented from leaking out from the tip end of the pen while in writing with it, and the viscosity of the ink in writing under shear force applied thereto is not so high as compared with that of oily ink. However, when compared with water-based ballpoint pens, the feel in writing with the shear-thinning ballpoint pen is not so good, and, in addition, at the start of writing with it, the ink is often difficult to transfer to the ball.

Moreover, the letters and images written with the shear-thinning ink are difficult to dry, and when they are felt with fingers or rubbed with each other, they may be often transferred onto the non-written background area to stain it.
[Patent Reference 1]
 U.S. Pat. No. 4,545,818

SUMMARY OF THE INVENTION

The invention is to solve the above-mentioned problems with conventional ballpoint pens, and is to provide a ballpoint pen which has a relatively simple structure and is inexpensive and which has good writing properties in that it feels light while writing with it and gives thick letters and images and that it can write well from the start of writing with it and the letters and images written with it may dry rapidly.

Specifically, the invention has a following constitution.

(1) A water-based ballpoint pen comprising:
 an aqueous ink;
 a ball;
 a ballpoint pen tip for holding said ball at a front end thereof and for discharging said ink from said top end portion;
 an ink follower following said ink with consumption of said ink; and
 an ink container directly containing said ink and said ink follower and for supplying said ink to said tip, said ink container communicating with a rear portion of said tip,
 wherein the ink is selected from (i) a shear-thinning aqueous ink that has a viscosity of from 3 to 160 mPa·s, measured with an E-type rotary viscometer at 20° C. and at 100 rpm, and has a shear-thinning index of from 0.9 to 0.99, and (ii) a non-shear-thinning aqueous ink having a viscosity of from 1 to 50 mPa·s, measured with an B-type rotary viscometer at 20° C., and
 wherein the ink follower comprises at least a base oil and a thickener and satisfies that the point ($\omega$) at which its tan δ in viscoelasticity determination exceeds 1 falls within a range of 20 rad/s $\leq \omega \leq$ 450 rad/s.

(2) The water-based ballpoint pen according to the above (1), wherein the base oil of the ink follower is at least one selected from polybutene and silicone oil and the thickener thereof is at least one selected from fatty acid amide or silica.

(3) The water-based ballpoint pen according to the above (1) or (2), further comprising an elastic member that urges the ball toward the front end of the tip when no stress is applied to the ball, and wherein the ball is retractable from the front end of the tip when stress is applied to the ball.

(4) The water-based ballpoint pen according to any one of the above (1) to (3), which further comprises a solid ink follower combined with the ink follower.

(5) The water-based ballpoint pen according to any one of the above (1) to (4), which further comprises:
 a ball point pen refill containing the ink container, the ink container communicating with a rear portion of said tip;
 a tubular member containing said ball point pen refill, wherein the tip is retractably projected from a front end of the tubular member.

(6) The water-based ballpoint pen according to the above (5), further comprising a spring disposed in the tubular member to urge the ball point pen refill toward a rear portion of the tubular member, wherein the tip is projected from the front end of the tubular member when the ball point refill is pressed toward the front end of the tubular member against an urging force of the spring.

(7) The water-based ballpoint pen according to the above (5) or (6), further comprising a clip formed on the front outside of the tubular member.

Figure 1:
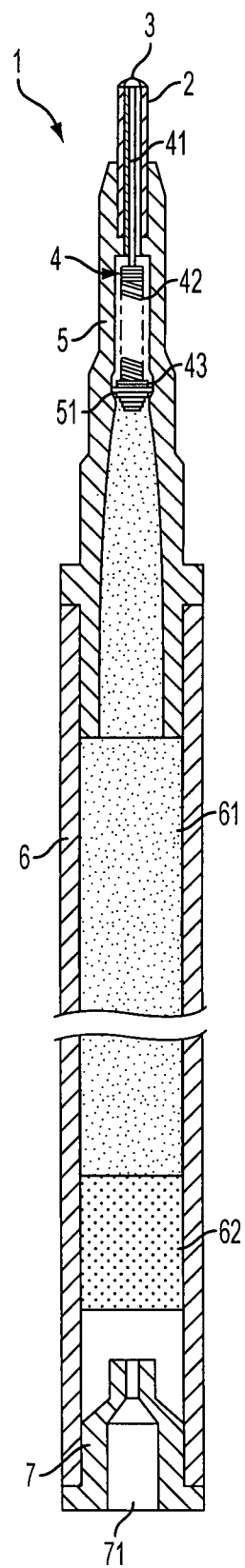
FIG. 1 is a longitudinal section of the embodiment of a water-based ballpoint pen refill used in the invention.

In Figs., sign 1 is a water-based ballpoint pen refill, sign 2 is a ballpoint pen tip, sign 3 is a ball, sign 4 is a elastic member, sign 41 is a rod, sign 42 is a coil, sign 43 is a tube swelling, sign 5 is a connecting member, sign 51 is a hooking projection, sign 6 is an ink container, sign 61 is an ink, sign 62 is an ink follower, sign 7 is a tail stopper, sign 71 is a vent hole, sign 8 is a water-based ballpoint pen of haunting type, sign 81 is a tubular member, sign 82 is a spring, sign 83 is a clip.

DETAILED DESCRIPTION OF THE INVENTION

The ballpoint pen tip may have any conventional and popular tip structure heretofore known in the art. For example, a metal is machined into a tube having a ball receiver and an ink guide formed inside it; or a metal pipe is worked to form a plurality of inner projections on the inner face at around the top end thereof by pressure deformation from the outer surface thereof, and ink flow grooves that radially extend from the center part toward the outside in the radical direction thereof are formed between the inner projections. In particular, the tip formed by the pressure deformation enables a good writing feel at a low writing pressure, since the contact area thereof with the back end of the ball in the tip is relatively small.

The ball to be held in the ballpoint pen tip is effectively a ball formed of hard metal, stainless steel, ruby, ceramics or the like and having an outer diameter of from 0.3 to 1.5 mm; and the movable distance of the ball in the radial direction thereof between the inner diameter of the ball-holding part of the tip and the ball is preferably from 10 to 50 μm, and the movable distance of the ball in the axial direction is preferably from 10 to 30 μm.

Preferably, the ballpoint pen tip has an elastic member that springs the back end of the ball in the forward direction thereof, in which the elastic member is so designed that it presses the ball against the inner edge of the front (top) end of the tip to form a closed condition during non-writing, but, during writing, the ball is moved backward owing to the writing pressure thereto to discharge the ink from the front top end portion of the tip. Having the constitution, the ballpoint pen prevents ink leakage from it while it is not in use.

Examples of the elastic member are a spring of fine metal wire, a rod-combined metal spring constructed by bonding a straight part (rod) to one end of the metal spring, and a plastic spring formed by working a linear plastic. Having a spring force of from 15 to 45 g, the elastic member is constituted to be pressable and applied to the pen tip.

The ink container that is bonded to the ballpoint pen tip directly or via a connecting member may be any popular tubular member, for which, for example, usable are shaped members of thermoplastic resin such as polyethylene, polypropylene or polyethylene terephthalate. These are favorable as they well retard vaporization of ink and their productivity is good.

The ink container preferably has an inner diameter of from 2.5 to 10 mm.

Also preferably, the ink container is formed of a transparent, colored transparent or semitransparent shaped article, as it enables to confirm the ink color and the ink quantity through it.

The ink container may form a refill to be inserted into a tubular member, or may have a tip fitted to the top thereof to form a tubular member and the tubular member may be directly filled with ink.

The ballpoint pen of a type wherein the refill is contained in the tubular member can be of a knock type such as back-end knock type or side knock type wherein the above-described refill is prepared so as to go in and out without using a cap or of a rotary type in addition to a ballpoint pen wherein a cap is used.

The ink to be directly filled in the ink container may be any one selected from a shear-thinning aqueous ink that has a viscosity (20° C.) of from 3 to 160 mPa·s, measured with an EM-type rotary viscometer at 100 rpm, and has a shear-thinning index of from 0.9 to 0.99, or a non-shear-thinning aqueous ink having a viscosity at 20° C. of from 1 to 50 mPa·s. The shear-thinning index is a value, n, in the experimental formula $T=Kj^n$ (where K and n are calculated constants) that is derived through viscometric rheological determination of the shear stress value (T) and the shear rate (j) of the ink.

Conventional materials known for providing shear-thinning properties can be used in the shear-thinning aqueous ink. Examples of such materials are water-soluble or dispersible, xanthan gum, welan gum, succinoglycan (organic acid-modified heteroglycan composed of glucose unit and galactose unit, having a mean molecular weight of from about 100 to 8,000,000), guar gum, locust bean gum and its derivatives, hydroxyethyl cellulose, alkyl alginates, polymers mainly comprising alkyl methacrylate and having a molecular weight of from 100,000 to 150,000, glycomannan, thickening polysaccharides having a gelling property and extracted from seaweed such as agar and carrageenan, benzylidenesorbitol and benzylidenexylitol and their derivatives, crosslinking acrylic acid polymers, inorganic fine particles, nonionic surfactants having HLB of from 8 to 12 such as polyglycerin fatty acid esters, polyoxyethylenesorbitan fatty acid esters, polyethylene glycol fatty acid esters, polyoxyethylene castor oil, polyoxyethylene lanolin-lanolin alcohol-bees wax derivatives, polyoxyethylene alkyl ether-polyoxypropylene alkyl ethers, polyoxyethylene alkylphenyl ethers, fatty acid amides, as well as salts of dialkyl or dialkenylsulfosuccinates. These can be used either singly or as combined.

In addition, a mixture of N-alkyl-2-pyrrolidone and anionic surfactant, and a mixture of polyvinyl alcohol and acrylic resin can also be used.

The amount of the shear-thinning agent to be added to the ink may be suitably varied within a range within which the ink may have the shear-thinning index defined herein.

The shear-thinning property of the ink indicates the rheological property thereof, and it means that the ink is highly viscous and is hardly fluid when it is in a static condition or when it receives a low stress, but its viscosity lowers and it becomes well fluid when it receives an increased stress. Therefore, the shear-thinning property may also be referred to as a thixotropic or pseudoplastic liquid property. Accordingly, while used for writing with it under a high shear stress applied thereto, the three-dimensional structure of the ink composition is temporarily broken and the viscosity thereof is therefore lowered. As a result, the viscosity of the ink at the top end of a ballpoint pen lowers suitably for writing with it, and the ink is therefore transferred onto the surface of paper. While not used for writing, the ink has a high viscosity and is prevented from leaking out of a ballpoint pen, and, in addition, separation and back flow of the ink may also be prevented. Further, the physical properties of the ink can be kept stable for long.

For the colorant to be in the ink, usable are all dyes and pigments soluble or dispersible in aqueous media, and their examples are mentioned below.

Acid dyes, basic dyes and direct dyes are usable in the ink.
The acid dyes include:
New Coccine (C.I. 16255),
Tartrazine (C.I. 19140),
Acid Blue Black 10B (C.I. 20470),
Guinea Green (C.I. 42085),
Brilliant Blue FCF (C.I. 42090),
Acid Violet 6B (C.I. 42640),
Soluble Blue (C.I. 42755),
Naphthalene Green (C.I. 44025),
Eosine (C.I. 45380),
Phloxine (C.I. 45410),
Erythrosin (C.I. 45430),
Nigrosine (C.I. 50420),
Acid Flavin (C.I. 56205).
The basic dyes include:
Chrysoidine (C.I. 11270),
Methyl Violet FN(C.I. 42535),
Crystal Violet (C.I. 42555),
Malachite Green (C.I. 42000),
Victoria Blue FB (C.I. 44045),
Rhodamine B (C.I. 45170),
Acridine Orange NS (C.I. 46005),
Methylene Blue B (C.I. 52015).
The direct dyes include:
Congo Red (C.I. 22120),
Direct Sky Blue 5B (C.I. 24400),
Violet BB (C.I. 27905),
Direct Deep Black EX (C.I. 30235),
Kayarus Black G Conc (C.I. 35225),
Direct Fast Black G (C.I. 35255),
Phthalocyanine Blue (C.I. 74180).

The pigments include inorganic pigments such as carbon black and ultramarine; organic pigments such as copper phthalocyanine blue and benzidine yellow; and aqueous pigment dispersions prepared by finely and stably dispersing pigment in aqueous media by the use of surfactant or resin. Their examples are as follows:
C.I. Pigment Blue 15:3B (trade name, Sandye Super Blue GLL by Sanyo Dye, having a pigment content of 24%),
C.I. Pigment Red 146 (trade name, Sandye Super Pink FBL by Sanyo Dye, having a pigment content of 21.5%),
C.I. Pigment Yellow 81 (trade name, TC Yellow FG by Dainichi Seika Kogyo, having a pigment content of about 30%),
C.I. Pigment Red 220/166 (trade name, TC Red FG by Dainichi Seika Kogyo, having a pigment content of about 35%).

The resin for dispersing the pigment includes polyamide resin, polyurethane resin, polyester resin, epoxy resin, melamine resin, phenolic resin, silicone resin, polyvinyl alcohol, polyvinylpyrrolidone, polyvinyl acetate, polyvinyl chloride, polyvinylidene chloride, polystyrene, acrylic acid resin, maleic acid resin, gum arabic, cellulose, dextran, casein, and their derivatives, as well as copolymers of the above-mentioned resins.

Particulate fluorescent pigments in synthetic resin are also usable herein, which are produced by dispersing a solid solution of fluorescent dye in resin matrix.

In addition, further usable herein are white pigments such as titanium dioxide; metal powders such as aluminium powder; pearl pigments prepared by coating the surface of a core substance selected from natural mica, synthetic mica, alumina or glass powder with a metal oxide such as titanium dioxide; and cholesteric liquid-crystal brilliant pigments.

For the solvent to be in the ink, usable are water and conventional water-soluble organic solvents that are generally used in the art. Their examples are ethanol, propanol, butanol, glycerin, sorbitol, triethanolamine, diethanolamine, monoethanolamine, ethylene glycol, diethylene glycol, thiodiethylene glycol, hexylene glycol, 1,3-butanediol, neoprene glycol, polyethylene glycol, propylene glycol, butylene glycol, ethylene glycol monomethyl ether, ethylene glycol monoethyl ether, diethylene glycol monomethyl ether, diethylene glycol monoethyl ether, ethylene glycol monomethyl ether acetate, propylene glycol monomethyl ether, propylene glycol monoethyl ether, 2-pyrrolidone, N-methyl-2-pyrrolidone.

One or more such water-soluble organic solvents may be used either singly or as combined. The amount of the solvent to be in the ink may be from 2 to 60% by weight, preferably from 5 to 35% by weight.

If desired, the ink may contain a pH-controlling agent, and a preservative or a mildew-proofing agent.

The pH-controlling agent includes ammonia, sodium carbonate, sodium phosphate, sodium hydroxide, sodium acetate and other inorganic salts, as well as organic basic compounds, for example, water-soluble amine compounds such as triethanolamine and diethanolamine.

The preservative or mildew-proofing agent includes carbolic acid, 1,2-benzisothiazolin-3-one sodium salt, sodium benzoate, sodium dehydroacetate, potassium sorbate, propyl paraoxybenzoate, 2,3,5,6-tetrachloro-4-(methylsulfonyl)pyridine.

In addition, a fluorine-containing surfactant as well as a nonionic, anionic or cationic surfactant for improving solvent penetrability, and a defoaming agent such as dimethylpolysiloxane may also be added to the ink.

One or more water-soluble resins such as alkyd resin, acrylic resin, styrene-maleic acid copolymer, cellulose derivative, polyvinylpyrrolidone, polyvinyl alcohol and dextrin may also be added to the resin within a range thereof not interfering with the drying resistance of the ink; and one or more wetting agents such as urea, nonionic surfactant, sorbitol, mannitol, sucrose, glucose, reducing starch hydrolyzate and sodium pyrophosphate may also be added thereto.

Further, a rustproofing agent and a lubricant may also be added to the ink.

The rustproofing agent includes benzotriazole and its derivatives, tolyltriazole, dicyclohexylammonium nitrite, diisopropylammonium nitrite, sodium thiosulfate, salts of ethylenediaminetetraacetic acid, saponin, dialkylthiourea.

The lubricant includes metal soap, polyalkylene glycol fatty acid esters, ethylene oxide-added cationic activator, phosphate-type activator, salts of thiocarbamic acid, salts of dimethyldithiocarbamic acid.

Preferred examples of the lubricant are compounds of the following general formula (I) and phosphate-type surfactants described in JP-B 1-13508.

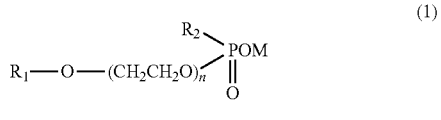

wherein $R_1$ represents an alkyl, alkenyl, phenyl or alkylphenyl group having from 8 to 18 carbon atoms; $R_2$ represents OH, OM, R—O—$(CH_2CH_2O)_n$; M represents an alkali metal, an amine or an alkanolamine; n indicates from 1 to 30.

The ink follower is filled into the ink container that contains the ink, at the end edge of the ink therein.

The ink follower comprises a base oil of a known nonvolatile liquid or hardly-volatile liquid such as polybutene, α-olefin oligomer, silicone oil or pure mineral oil, and a thickener such as silica, aluminium silicate, swellable mica or fatty acid amide added to the base oil.

For the base oil of the ink follower, preferred is polybutene or silicone oil; and for the thickener thereof, preferred is fatty acid amide or silica.

The ink follower for use in the invention is so constituted that the point (ω) at which its tan δ in viscoelasticity determination exceeds 1 falls within a range of 20 rad/s≦ω≦450 rad/s. The point (ω) is preferably within a range of 50 rad/s≦ω≦400 rad/s.

This is described in detail. The ink to be in the ballpoint pen is a shear-thinning aqueous ink that has a viscosity of from 3 to 160 mPa·s, measured with an E-type rotary viscometer at 20° C. at 100 rpm, and has a shear-thinning index of from 0.9 to 0.99, or a non-shear-thinning aqueous ink having a viscosity of from 1 to 50 mPa·s. The static viscosity of the ink is low, and therefore, the impact resistance thereof is lower than that of conventional shear-thinning ink of which the shear-thinning index is controlled to fall between 0.1 and 0.6 or so. Accordingly, the ink may leak out from the end of the ink container and the ballpoint pen would be useless for writing, and, as a result, the pen would lose its commercial value. In addition, the shear-thinning aqueous ink preferably has a viscosity of from 3 to 100 mPa·s.

In the invention, the ink follower that is to be disposed at the end of the ink in the ballpoint pen is made resistant to impact to thereby solve the above-mentioned problems.

The ink follower is viscoelastic, and its property is medium between elasticity response and viscosity response.

The viscoelasticity of the ink follower is determined through rheometric oscillation, and the tan δ thereof is a value obtained by dividing the loss modulus by the storage modulus thereof. The ink follower having a lower value of tan δ (tan δ<1) is highly elastic and is poorly viscous. On the other hand, the ink follower having a higher value of tan δ (tan δ>1) is poorly elastic and is highly viscous.

In the invention, the region where the angular frequency (rad/d) is 20 or more in the above-mentioned viscoelasticity determination is near to the condition where impact has been given to ballpoint pens, for example, ballpoint pens have been dropped.

Accordingly, the ink follower of which the viscoelasticity indicated by tan δ is more than 1 at 20 rad/s may have a satisfactory impact resistance depending on the intensity of the viscosity response thereof.

The point at which the above-mentioned value tan δ exceeds 1 is 20 rad/s or more, but if it is more than 450 rad/s, then the elasticity response of the ink follower may be too strong and the ink follower may lose its function to follow ink, and if so, the ink release from the ballpoint pen will be poor.

Accordingly, the ink follower is specifically so constituted that the point (ω) at which its tan δ exceeds 1 falls within a range of 20 rad/s≦ω≦450 rad/s, whereby it satisfies both good impact resistance and good writing capability.

The ink follower in the invention may be combined with a solid stopper formed of resin.

EXAMPLES

Examples of the invention are described below, to which, however, the invention should not be limited. In the following Examples, all parts mean parts by weight.

Preparation of Shear-Thinning Aqueous Ink:

| | |
|---|---|
| Black Dye [Orient Chemical Industry's C.I. 35255; trade name, Water Black 100-L having an effective content of 20%] | 40.0 parts |
| Phosphate-type Surfactant (lubricant) [Daiichi Kogyo Seiyaku's trade name Plysurf AL] | 1.0 part |
| Carbolic Acid (antiseptic) | 0.4 parts |
| Triethanolamine (pH-controlling agent) | 1.0 part |
| λ-carrageenan (thickener) | 0.2 parts |
| Diethylene Glycol | 15.0 parts |
| Water | 42.4 parts |

The colorant and various additives were added to a part of the solvent mentioned above. Apart from this, the thickener was added to the other part of the solvent. These were mixed and stirred for 1 hour to prepare a shear-thinning aqueous ink A.

The viscosity of the ink, measured with an EMD-type rotary viscometer (Toki Sangyo's RE-80R with a standard rotor) at 20° C., was 9.0 mPa·s at 100 rpm, and the shear-thinning index thereof was 0.97.

Preparation of Non-Shear-Thinning Aqueous Ink:

| | |
|---|---|
| Blue Dye [Sumitomo Chemical's C.I. 42655; trade name, Acid Blue PG] | 7.0 parts |
| Phosphate-type Surfactant (lubricant) [Daiichi Kogyo Seiyaku's trade name Plysurf AL] | 1.0 part |
| Carbolic Acid (antiseptic) | 0.4 parts |
| Triethanolamine (pH-controlling agent) | 1.0 part |
| Polyvinylpyrrolidone (thickener) [BASF's trade name, Luviskol K-30 having a molecular weight of 40,000] | 4.0 parts |
| Diethylene Glycol | 20.0 parts |
| Water | 66.6 parts |

The colorant and various additives were added to a part of the solvent mentioned above. Apart from this, the thickener was added to the other part of the solvent. These were mixed and stirred for 1 hour to prepare a non-shear-thinning aqueous ink B.

The viscosity of the ink, measured with a B-type rotary viscometer (Tokyo Keiki's BL with a BL adaptor) at 20° C., was 9.5 mPa·s at 60 rpm.

Preparation of Shear-Thinning Aqueous Ink:

| | |
|---|---|
| Red Dye [Eisen's C.I. 45410, Acid Red 92] | 5.0 parts |
| Phosphate-type Surfactant (lubricant) [Daiichi Kogyo Seiyaku's trade name Plysurf AL] | 1.0 part |

-continued

| | |
|---|---|
| Carbolic Acid (antiseptic) | 0.4 parts |
| Triethanolamine (pH-controlling agent) | 1.0 part |
| Xanthan gum (thickener) | 0.3 parts |
| Diethylene Glycol | 15.0 parts |
| Water | 77.3 parts |

The colorant and various additives were added to a part of the solvent mentioned above. Apart from this, the thickener was added to the other part of the solvent. These were mixed and stirred for 1 hour to prepare a shear-thinning aqueous ink C.

The viscosity of the ink, measured with an EMD-type rotary viscometer (Toki Sangyo's RE-80R with a standard rotor) at 20° C., was 41.0 mPa·s at 100 rpm, and the shear-thinning index thereof was 0.25.

Preparation of Ink Follower:

15 parts of a thickener, fatty acid amide was added to 85 parts of a base oil, polybutene, and kneaded in a three-roll mill to prepare an ink follower 1.

Measured with a rheometer [Paar Physica's DSR4000 with a 2-degree cone plate (diameter, 25 mm)] at 20° C., tan δ of the ink follower exceeded 1 at 100 rad/s.

Preparation of Ink Follower:

5 parts of a thickener, hydrophobic silica was added to 95 parts of a base oil, dimethylsilicone oil, and kneaded in a three-roll mill to prepare an ink follower 2.

Measured with a rheometer [Paar Physica's DSR4000 with a 2-degree cone plate (diameter, 25 mm)] at 20° C., tan δ of the ink follower exceeded 1 at 200 rad/s.

Preparation of Ink Follower:

5 parts of a thickener, fatty acid amide was added to 95 parts of a base oil, polybutene, and kneaded in a three-roll mill to prepare an ink follower 3.

Measured with a rheometer [Paar Physica's DSR4000 with a 2-degree cone plate (diameter, 25 mm)] at 20° C., tan δ of the ink follower exceeded 1 at 10 rad/s.

Preparation of Ink Follower:

5 parts of fatty acid amide and 5 parts of hydrophobic silica both serving as a thickener were added to 90 parts of a base oil, polybutene, and kneaded in a three-roll mill to prepare an ink follower 4.

Measured with a rheometer [Paar Physica's DSR4000 with a 2-degree cone plate (diameter, 25 mm)] at 20° C., tan δ of the ink follower exceeded 1 at 500 rad/s.

Construction of Water-Based Ballpoint Pen:

The ink and the ink follower mentioned above were combined as in Table 1 given below, and filled into a ballpoint pen refill that had been constructed by fitting a stainless steel tip having a 0.5-mm ball at its top end, into one end of a polypropylene pipe (inner diameter, 3.8 mm). With that, the refill was inserted into a pen tubular member to construct a water-based ballpoint pen.

Thus constructed, all the water-based ballpoint pens were tested according to the following test methods.

Writing Test:

Every water-based ballpoint pen was tested for its touch in handwriting with it on writing paper A (JIS P3201).

Rubbing Test:

The letters or images that had been written on writing paper A (JIS P3201) with each water-based ballpoint pen were left as such for 5 minutes, then rubbed with fingers and checked as to whether or not the paper face around them became stained.

Ink Follow Test:

Using each water-based ball point pen, 10 circles each having a diameter of 2 cm were continuously written in one line, and this writing operation was continued for 1 minute to complete 17 lines each with 10 circles therein. All the thus-written circles were checked visually for their condition.

Impact Test:

With the side of the ink follower thereof facing upward, each water-based ballpoint pen was dropped onto a plate of Japanese cedar having a thickness of 30 mm from a height of 120 cm. The dropping test was repeated three times, and every pen was checked as to whether or not the ink flowed back in the refill thereof.

The combination of the ink and the ink follower, and the test results are shown in the following Table 1.

TABLE 1

| No. | Ink | Ink Follower | Writing Test | Rubbing Test | Ink Follow Test | Impact Test |
|---|---|---|---|---|---|---|
| 1 | A | 1 | ○ | ○ | ○ | ○ |
| 2 | B | 1 | ○ | ○ | ○ | ○ |
| 3 | A | 2 | ○ | ○ | ○ | ○ |
| 4 | B | 2 | ○ | ○ | ○ | ○ |
| 5 | C | 1 | Δ | x | ○ | ○ |
| 6 | A | 3 | ○ | ○ | ○ | x |
| 7 | B | 3 | ○ | ○ | ○ | x |
| 8 | C | 3 | Δ | x | ○ | ○ |
| 9 | A | 4 | ○ | ○ | x | ○ |
| 10 | B | 4 | ○ | ○ | x | ○ |
| 11 | C | 4 | x | x | Δ | ○ |

The meanings of the test results in Table are mentioned below.

Writing Test:

○: Ink flowed out well, and smooth writing was possible under light writing pressure.

Δ: Ink flowed out well, and smooth writing was possible under relatively light writing pressure.

X: Ink flowed out poorly in some degree, and smooth writing was not so easy.

Rubbing Test:

○: After rubbed, the paper face was not stained.

X: After rubbed, the paper face was stained.

Ink Follow Test:

○: Ink flowed out well at the start of writing, and good letters and images were written to the last.

Δ: Ink flowed out relatively poorly at the start of writing, and the letters and images were partly faint.

X: Ink flowed out poorly at the start of writing, and the letters and images were partly cut.

Impact Test:

○: No change.

X: The interface between the ink and the ink follower became greatly disordered, and the ink flowed back.

Preparation of Water-Based Ballpoint Pen Refill (See FIG. 1)

Water-based ballpoint pen refill 1 as shown in FIG. 1 comprises ballpoint pen tip 2 in which ball 3 is held rotatable at the top end thereof, connecting member 5 to which the ballpoint pen tip is fixed at the front thereof, ink tube 6 to which the connecting member is fixed in the opening of the top end and in which ink 61 and ink follower 62 are contained, tail stopper 7 which is fixed to the opening of the back end of the ink tube, and elastic member 4 that is contained in the inside of the above-described ballpoint pen tip and connecting member and urges the ball forward.

The above-described ink and the ink follower used herein are those described in the examples of the present invention.

The above-described elastic member comprises rod 41 and coil 42 at the rear and tube swelling 43 having an outside diameter larger than the outside diameter of the coil is formed at the back end of the coil 42.

The above-described tube swelling 43 is hooked at projection 51 in the inside of the above-described connecting member.

Vent hole 71 is provided through the tail stopper.

Figure 2:
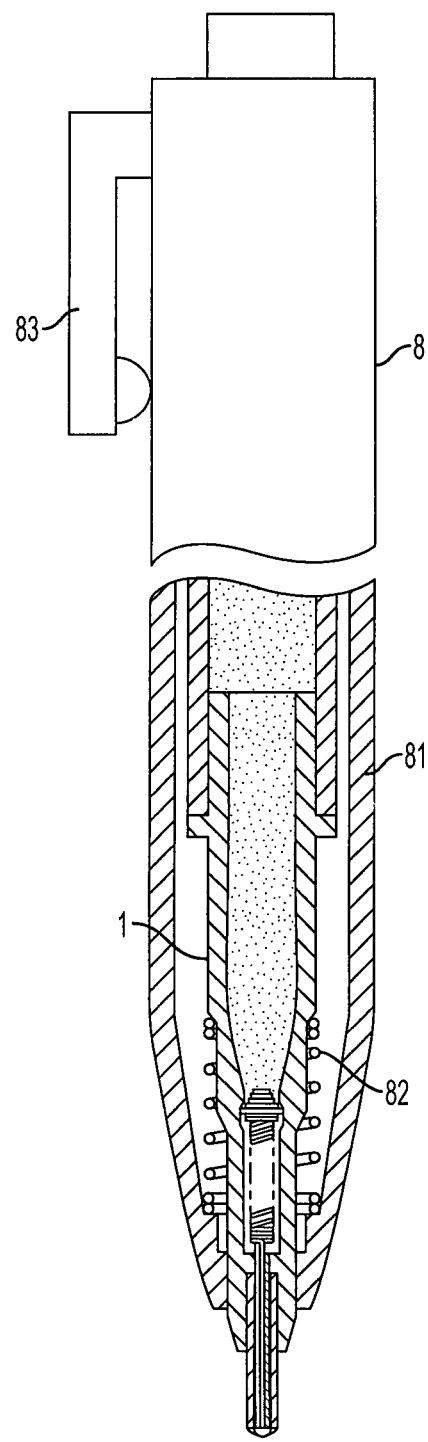
FIG. 2 is an explanatory drawing of the section of a water-based ballpoint pen of haunting type wherein the water-based ballpoint pen refill shown in FIG. 1 is inserted into the tubular member as a cartridge.

Preparation of Water-Based Ballpoint Pen of Haunting Type (See FIG. 2)

In water-based ballpoint pen of haunting type 8 as shown in FIG. 2, clip 83 that can hook the pen on a pocket of clothes is prepared on the back outside of tubular member 81, water-based ballpoint pen refill 1 as shown in FIG. 1 is contained in the interior of the tubular member in a condition to energize the refill 1 backward with the aid of spring 82 (coil spring), and ballpoint pen tip 2 is extruded outside from the hole of the top end of the tubular member by knocking the back end (knocking part) of the tubular member forward.

In the above-described water-based ballpoint pen of haunting type, a strong shock is applied to the ballpoint pen refill when the ballpoint pen tip enters the tubular member by energizing the tip backward with the aid of the spring. However, the shock is absorbed by ink follower 62 of the present invention which has viscoelasticity and the backflow of the ink 61 is completely prevented.

Figure 3:
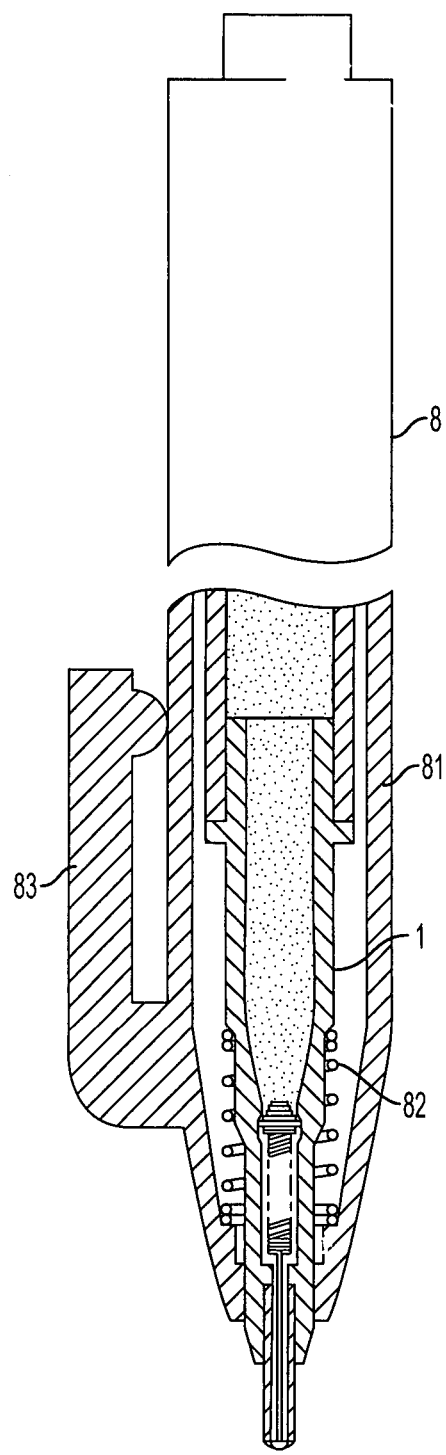
FIG. 3 is an another explanatory drawing of the longitudinal section of a water-based ballpoint pen of haunting type wherein the water-based ballpoint pen refill shown in FIG. 1 is inserted into the tubular member as a cartridge.

Preparation of Water-Based Ballpoint Pen of Haunt Type (See FIG. 3)

In water-based ballpoint pen of haunt type 8 as shown in FIG. 3, clip 83 that can hook the pen on a pocket of clothes is formed on the forward outside of tubular member 81 (outside of grip of the tubular member), water-based ballpoint pen refill 1 as shown in FIG. 1 is contained in the inside of the tubular member 81 in a condition to energize the refill 1 backward with the aid of spring 82 (coil spring), and ballpoint pen tip 2 is extruded outside from the top open end of the tubular member 81 by knocking the back end (knocking part) of the tubular member 81 forward.

Particularly, the water-based ballpoint pen of haunt type 8 of this example can be hooked on the pocket of clothes in a condition to point the pen point upward since the tubular member 81 has clip 83 on the forward outside thereof. This prevents ink from oozing out of the top end in a condition to be hooked on the pocket, resulting in evading soil of the clothes.

In the above-described water-based ballpoint pen of haunt type 8, a great shock is applied to ballpoint pen refill 1 when the ballpoint pen tip 2 enters the tubular member by urging the tip backward with the aid of the spring. However, the shock is absorbed by the ink follower of this invention which has viscoelasticity to prevent completely the backflow of the ink.

The invention provides a water-based ballpoint pen which has good writing properties in that it ensures good start in writing and gives thick letters and images under light writing pressure, and the letters and images written with it may dry rapidly.

What is claimed is:

1. A water-based ballpoint pen comprising:
   an aqueous ink;
   a ball;
   a ballpoint pen tip for holding said ball at a front end thereof and for discharging said ink from said top end portion;
   an ink follower following said ink with consumption of said ink; and
   an ink container directly containing said ink and said ink follower and for supplying said ink to said tip, said ink container communicating with a rear portion of said tip,
   wherein the ink is selected from (i) a shear-thinning aqueous ink that has a viscosity of from 3 to 160 mPa·s, measured with an E-type rotary viscometer at 20° C. and at 100 rpm, and has a shear-thinning index of from 0.9 to 0.99, and (ii) a non-shear-thinning aqueous ink having a viscosity of from 1 to 50 mPa·s, measured with an B-type rotary viscometer at 20° C., and
   wherein the ink follower comprises at least a base oil and a thickener and satisfies that the point ($\omega$) at which its tan $\delta$ in viscoelasticity determination exceeds 1 falls within a range of 20 rad/s$\leq\omega\leq$450 rad/s.

2. The water-based ballpoint pen according to claim 1, wherein the base oil of the ink follower is at least one selected from polybutene and silicone oil and the thickener thereof is at least one selected from fatty acid amide or silica.

3. The water-based ballpoint pen according to claim 1 or 2, further comprising an elastic member that urges the ball toward the front end of the tip when no stress is applied to the ball, and wherein the ball is retractable from the front end of the tip when stress is applied to the ball.

4. The water-based ballpoint pen according to any one of claims 1 to 3, which further comprises a solid ink follower combined with the ink follower.

5. The water-based ballpoint pen according to any one of claims 1 to 4, which further comprises:
   a ball point pen refill containing the ink container, the ink container communicating with a rear portion of said tip;
   a tubular member containing said ball point pen refill, wherein the tip is retractably projected from a front end of the tubular member.

6. The water-based ballpoint pen according to claim 5, further comprising a spring disposed in the tubular member to urge the ball point pen refill toward a rear portion of the tubular member, wherein the tip is projected from the front end of the tubular member when the ball point refill is pressed toward the front end of the tubular member against an urging force of the spring.

7. The water-based ballpoint pen according to claim 5 or 6, further comprising a clip formed on the front outside of the tubular member.

* * * * *